US00RE45801E

(19) United States
(12) Reissued Patent
Krudo

(10) Patent Number: US RE45,801 E
(45) Date of Reissued Patent: Nov. 17, 2015

(54) LETHAL OR NON-LETHAL SELF-DEFENSE BLADED TOOL

(76) Inventor: Louis Krudo, Tampa, FL (US)

(21) Appl. No.: 13/374,702

(22) Filed: Jan. 9, 2012

Related U.S. Patent Documents

Reissue of:
(64) Patent No.: 7,940,510
Issued: May 10, 2011
Appl. No.: 12/141,207
Filed: Jun. 18, 2008

(51) Int. Cl.
*H01T 23/00* (2006.01)
*F41B 13/00* (2006.01)
*B26B 11/00* (2006.01)
*B26B 1/04* (2006.01)

(52) U.S. Cl.
CPC ..... *B26B 11/00* (2013.01); *B26B 1/044* (2013.01)

(58) Field of Classification Search
CPC ..... B26B 11/00; B26B 1/044
USPC ..... 30/159
See application file for complete search history.

(56) References Cited

U.S. PATENT DOCUMENTS

| | | | | |
|---|---|---|---|---|
| 4,707,920 | A * | 11/1987 | Montgomery | 30/294 |
| 5,896,665 | A * | 4/1999 | Harris | 30/160 |
| 6,438,848 | B1 * | 8/2002 | McHenry et al. | 30/161 |
| 6,791,816 | B2 * | 9/2004 | Stethem | 361/232 |
| 7,024,772 | B1 * | 4/2006 | Shaver et al. | 30/2 |
| 7,051,441 | B2 * | 5/2006 | Carter, III | 30/161 |
| 7,296,355 | B2 * | 11/2007 | Onion | 30/159 |
| 7,647,701 | B1 * | 1/2010 | Mollick et al. | 30/155 |
| 8,286,356 | B1 * | 10/2012 | Mollick et al. | 30/155 |
| 2002/0000042 | A1 * | 1/2002 | Glesser et al. | 30/160 |
| 2003/0046818 | A1 * | 3/2003 | Glesser | 30/161 |
| 2003/0070299 | A1 * | 4/2003 | Frazer | 30/161 |
| 2003/0126746 | A1 * | 7/2003 | Yu | 30/161 |
| 2004/0187313 | A1 * | 9/2004 | Zirk et al. | 30/123 |
| 2006/0042098 | A1 * | 3/2006 | Morales | 30/298 |

OTHER PUBLICATIONS

84 USPQ2d 1108 *Automotive Technologies International Inc.* v. *BMW of North America Inc.* U.S. Court of Appeals Federal Circuit 501 F3d 1274; Sep. 6, 2007.*

* cited by examiner

*Primary Examiner* — Jeffrey R Jastrzab
(74) *Attorney, Agent, or Firm* — Allen Dyer Doppelt Milbrath & Gilchrist

(57) ABSTRACT

A self defense tool comprising a generally S-shaped tool having at one end thereof a ring portion for finger placement. The handle portion is used for holding the S-shaped tool and the handle portion is located between the ring portion and a blade portion. The blade portion has a tip portion at an opposite end of the S-shaped tool, which is used to apply pressure to specific areas of a person's body. The blade portion further comprises an inside curve portion near said handle portion for trapping and hooking capabilities. The tool can be in a solid form or in a foldable version such as a folding knife. Additional embodiments include LED strobe and/or steady-on lights and shock voltage capabilities and an automatic blade release trigger and locking mechanism.

20 Claims, 13 Drawing Sheets

LETHAL OR NON-LETHAL SELF-DEFENSE BLADED TOOL

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The invention relates to lethal and non-lethal self-defense bladed tools.

BACKGROUND OF THE INVENTION

A tool for providing self-defense or means for controlling an attacker is a valuable asset in a culture where violence is common. In addition, law enforcement personnel needs tools that will enable them to control a suspect who may be violent in a non-lethal or less than lethal manner. What is needed is a tool that provides the above non-lethal control and/or protection from attackers that is easy to use and can be used with a minimal amount of strength form the user but the force can be incremented depending on the users skill level. When circumstances warrant, what is needed is a lethal self-defense tool as well.

SUMMARY OF THE INVENTION

A non-lethal or less than lethal nerve assisted grab compliance tool comprising a generally S-shaped tool having at one end thereof a ring portion for finger placement. The handle portion is used for holding the S-shaped tool and the handle portion is located between the ring portion and a blade portion. The blade portion has a tip portion at an opposite end of the S-shaped tool, which is used to apply pressure to specific areas of a person's body. The blade portion further comprises an inside curve portion for trapping and hooking capabilities. The compliance tool can be in a solid form or in a foldable version such as a folding knife. Additional embodiments include LED strobe and/or steady-on lights and shock voltage capabilities. In a further embodiment, the invention includes a trigger mechanism for auto-extending the blade and locking it into the open extended position. The mechanism is configured such that a tang portion can be moved laterally to allow the blade to be folded into a closed position where the blade is repositioned into the cavity of the handle.

BRIEF DESCRIPTION OF THE DRAWINGS

In the accompanying drawings:

FIG. 8I is a representational view of the a final stage of the motion depiction of the embodiment of FIGS. 8A-8E.

DETAILED DESCRIPTION OF THE INVENTION

Figure 1:
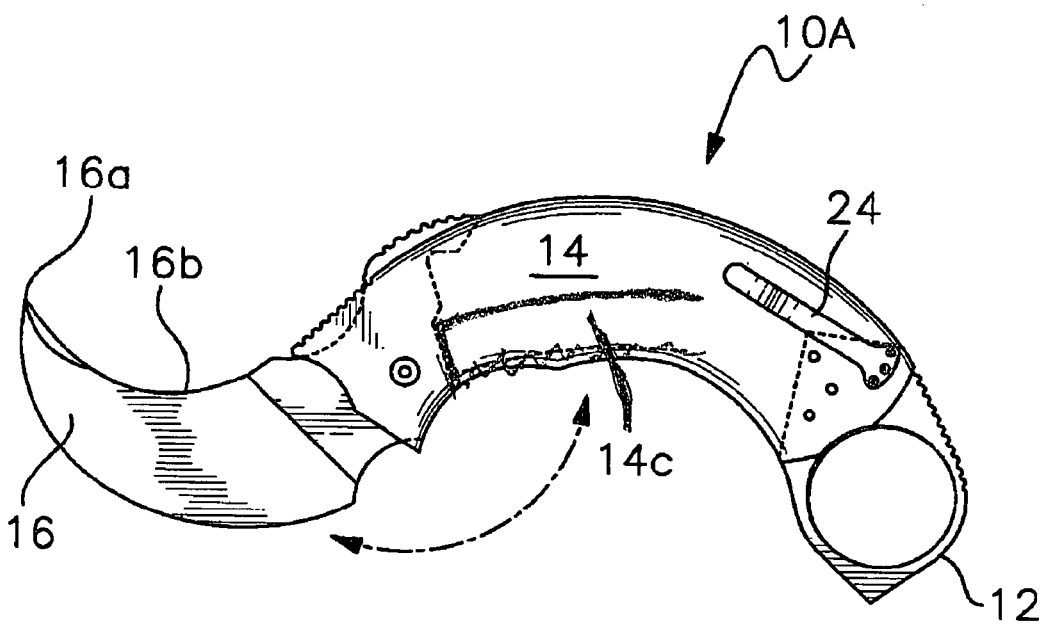
FIG. 1 is a front view depiction some of the features of a folding blade version of the present invention.

Referring now to the drawings, FIGS. 1, 2, 3A, 3B, 4, 5, 7A, 7B and 8A-8I disclose various embodiments of the present invention, which is a specialized nerve assisted grab (SNAG) lethal and non-lethal or less than lethal compliance tool, depicted generally as 10 for the solid version of the invention and 10A for the folding version of the invention.

The nerve assisted grab compliance tool is a generally S-shaped tool 10,10A having at one end thereof a ring portion 12 for finger placement, a handle portion 14 for holding the S-shaped tool, where the handle portion 14 is located between the ring portion 12 and a blade portion 16. The blade portion 16 has a tip portion 16a at an opposite end of the S-shaped tool 10,10A, which serves as means for applying pressure to specific areas or nerve pressure points of a person's body. The ring portion 12 is for placement of an index or small finger and can be used to trap digits for submission holds and/or for striking specific body areas.

In a preferred embodiment, the blade portion 16 further comprises an inside curve portion 16b for trapping or hooking capabilities.

Figure 6:
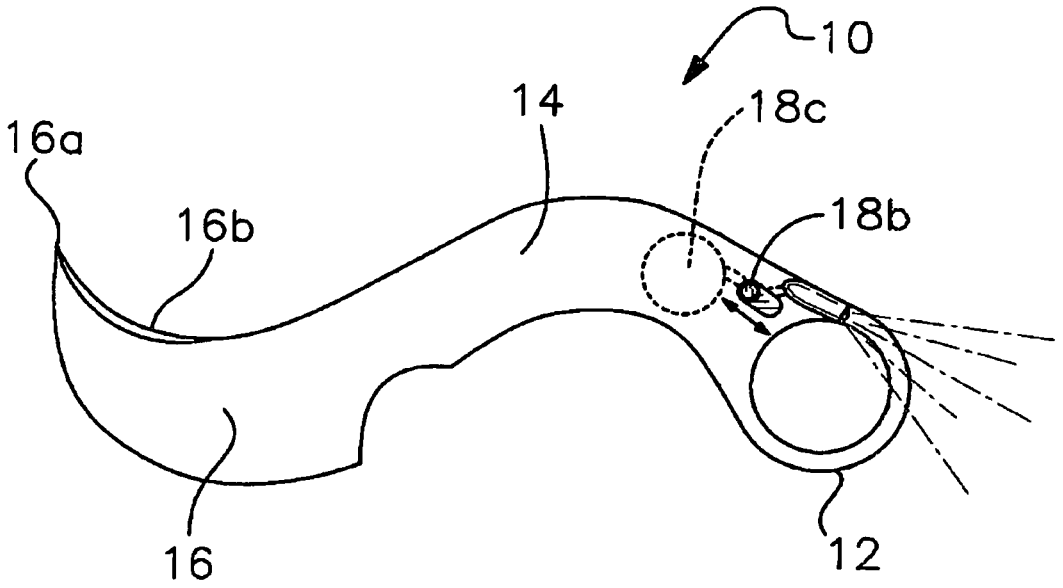
FIG. 6 is a view similar to FIG. 5 except depicting LED light/strobe light features.
Figure 7A:
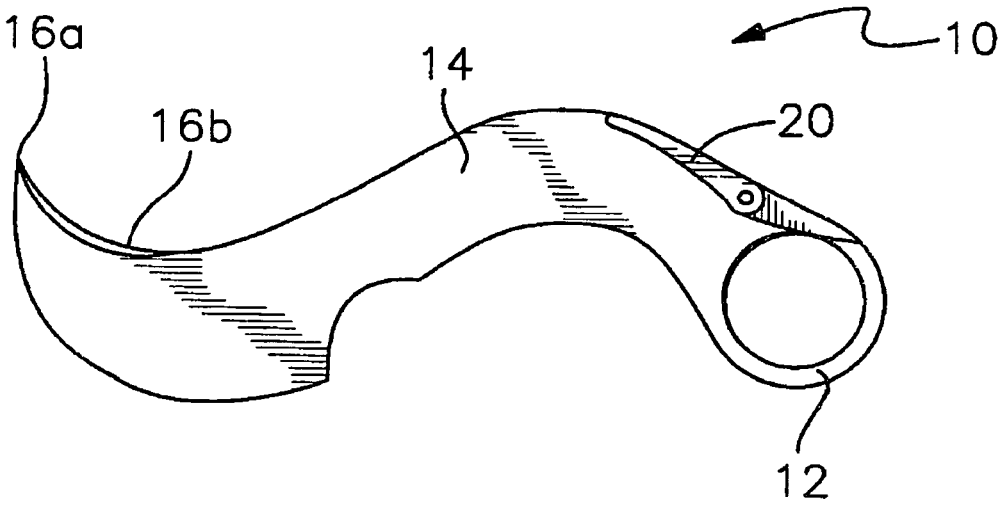
FIG. 7A is front view of the solid version depicting a thumb support member in a closed position.
Figure 7B:
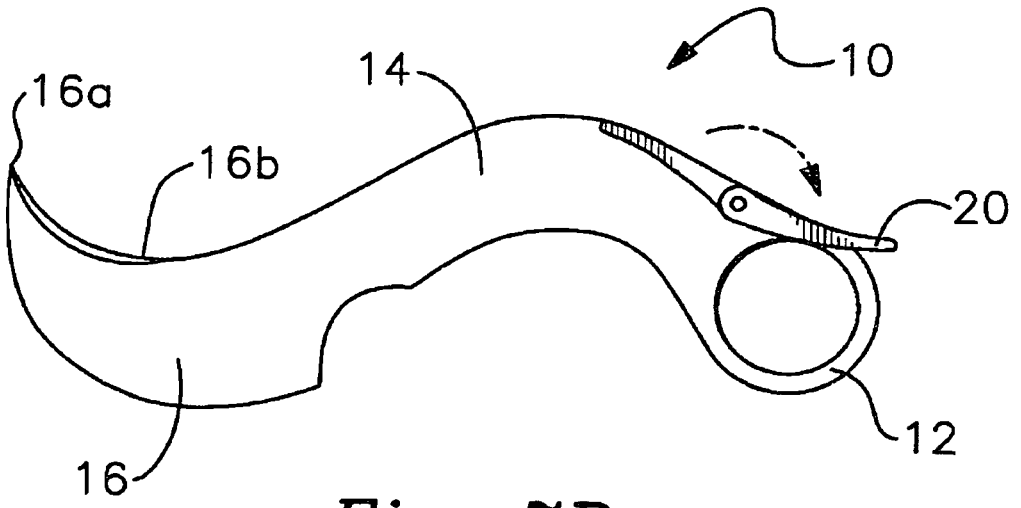
FIG. 7B is a front view similar to FIG. 7A with the thumb support member extended outward
Figure 8A:
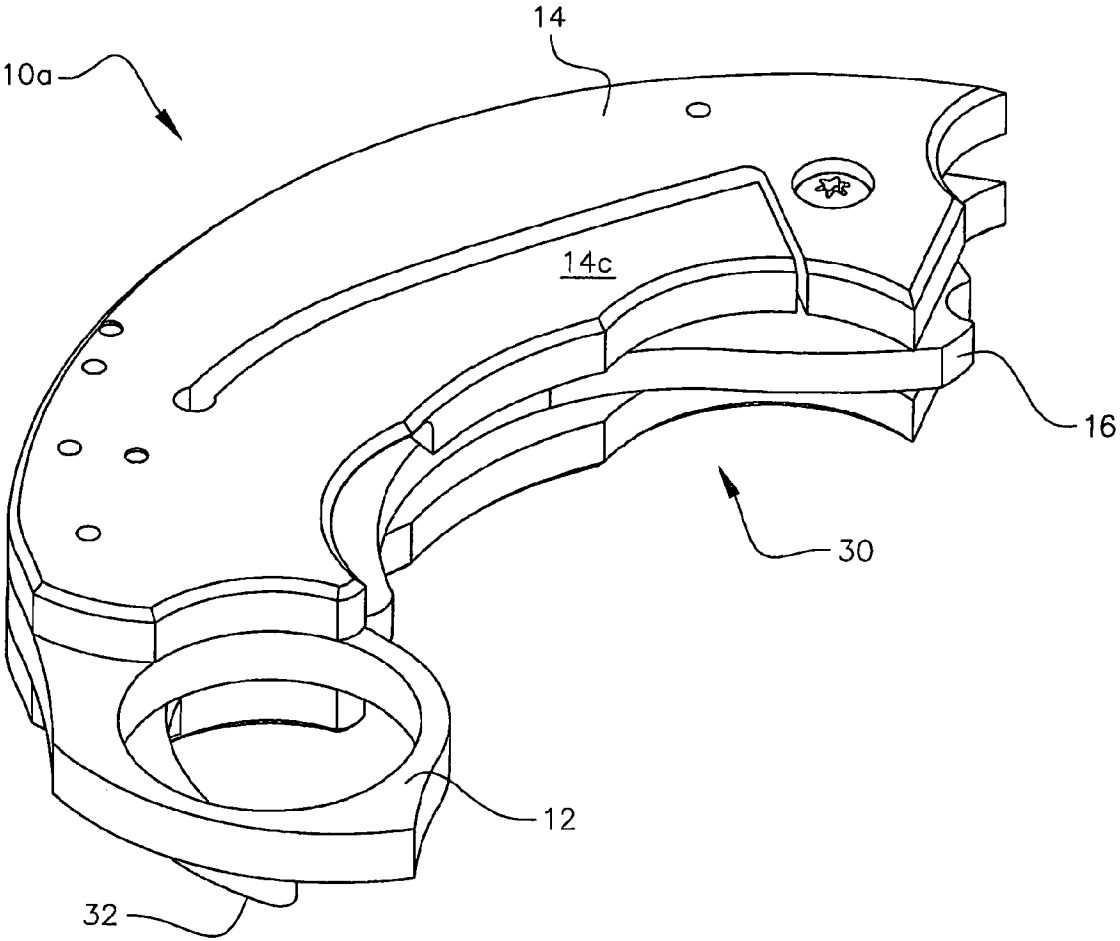
FIG. 8A is perspective representational view of another embodiment featuring a trigger and locking mechanism for auto-opening of the blade and depicting the blade in a closed position inside the cavity of the handle.
Figure 8B:
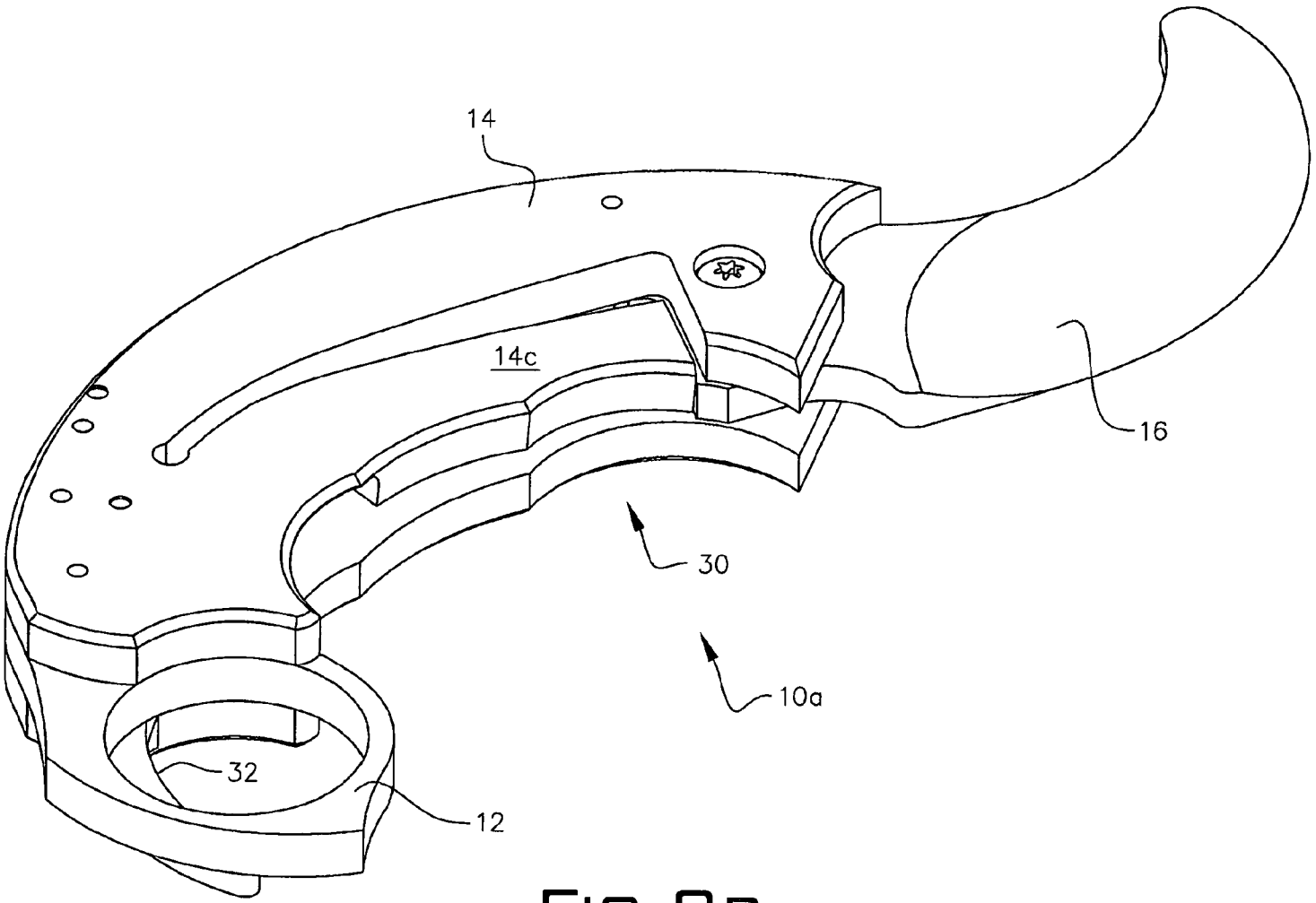
FIG. 8B is a representational view of the embodiment of FIG. 8A with the blade in an open position.
Figure 8C:
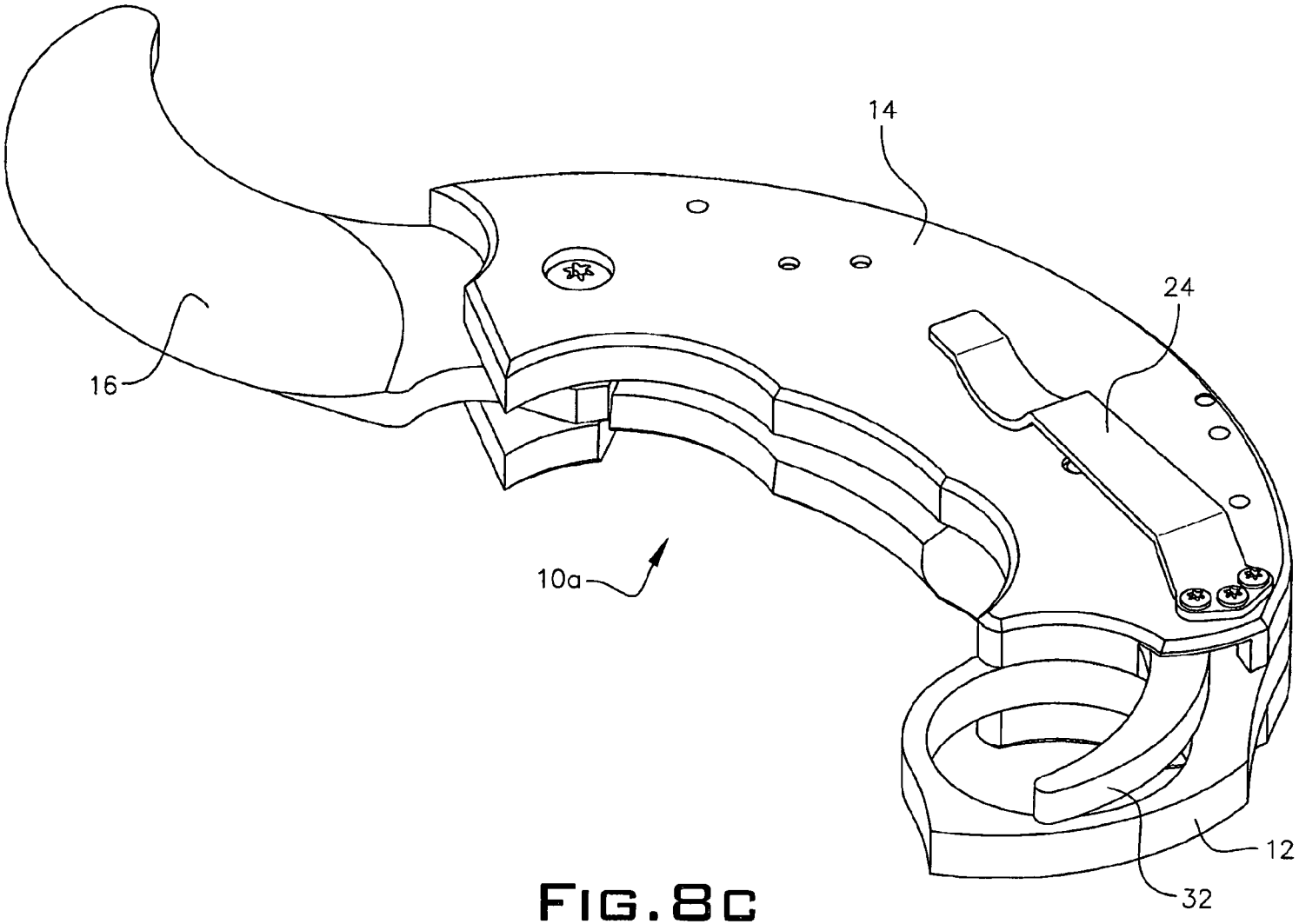
FIG. 8C is a representational view of the embodiment depicted in FIG. 8B from the back side of the tool.
Figure 8D:
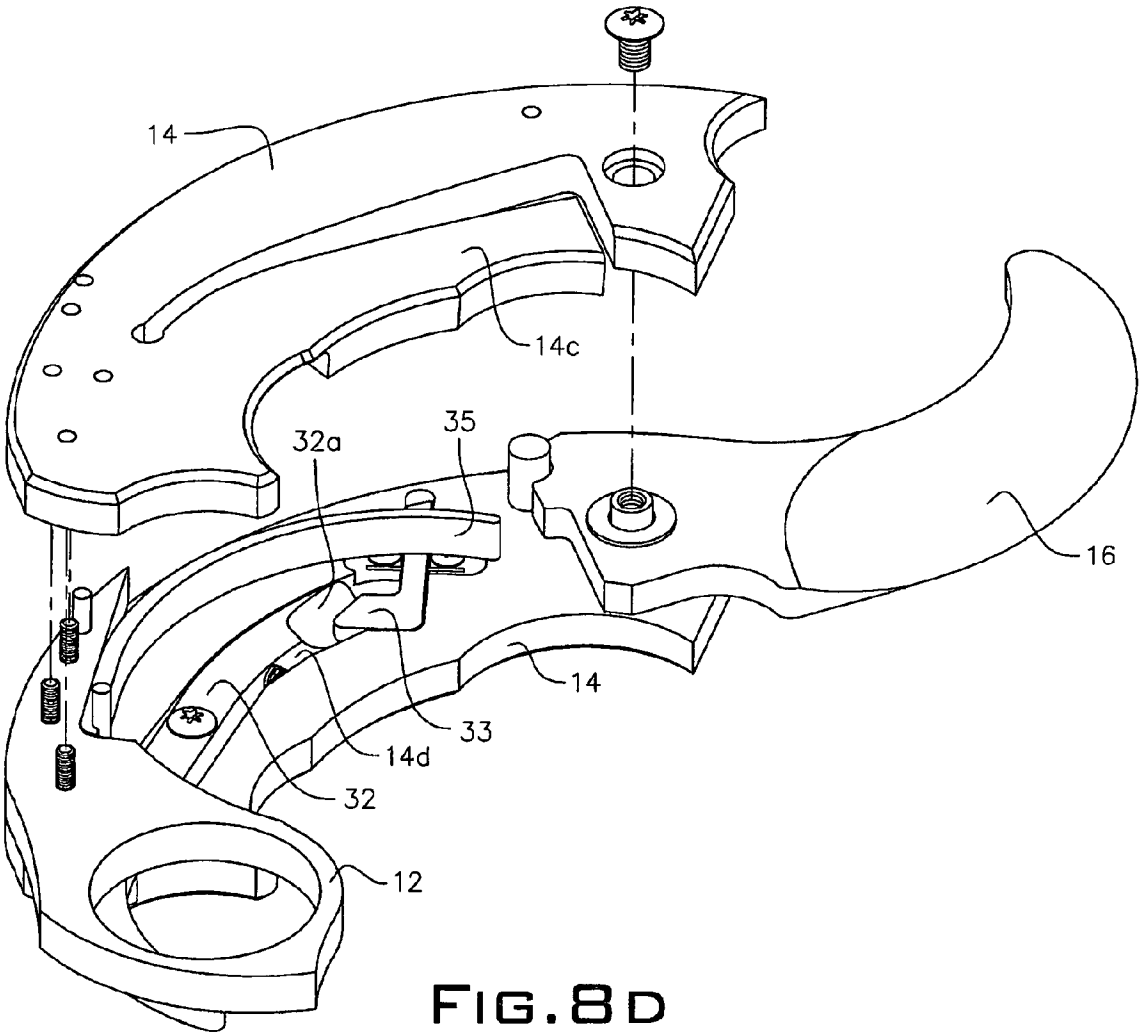
FIG. 8D is an exploded view of a representational example of the embodiment depicted in FIG. 8B.
Figure 8E:
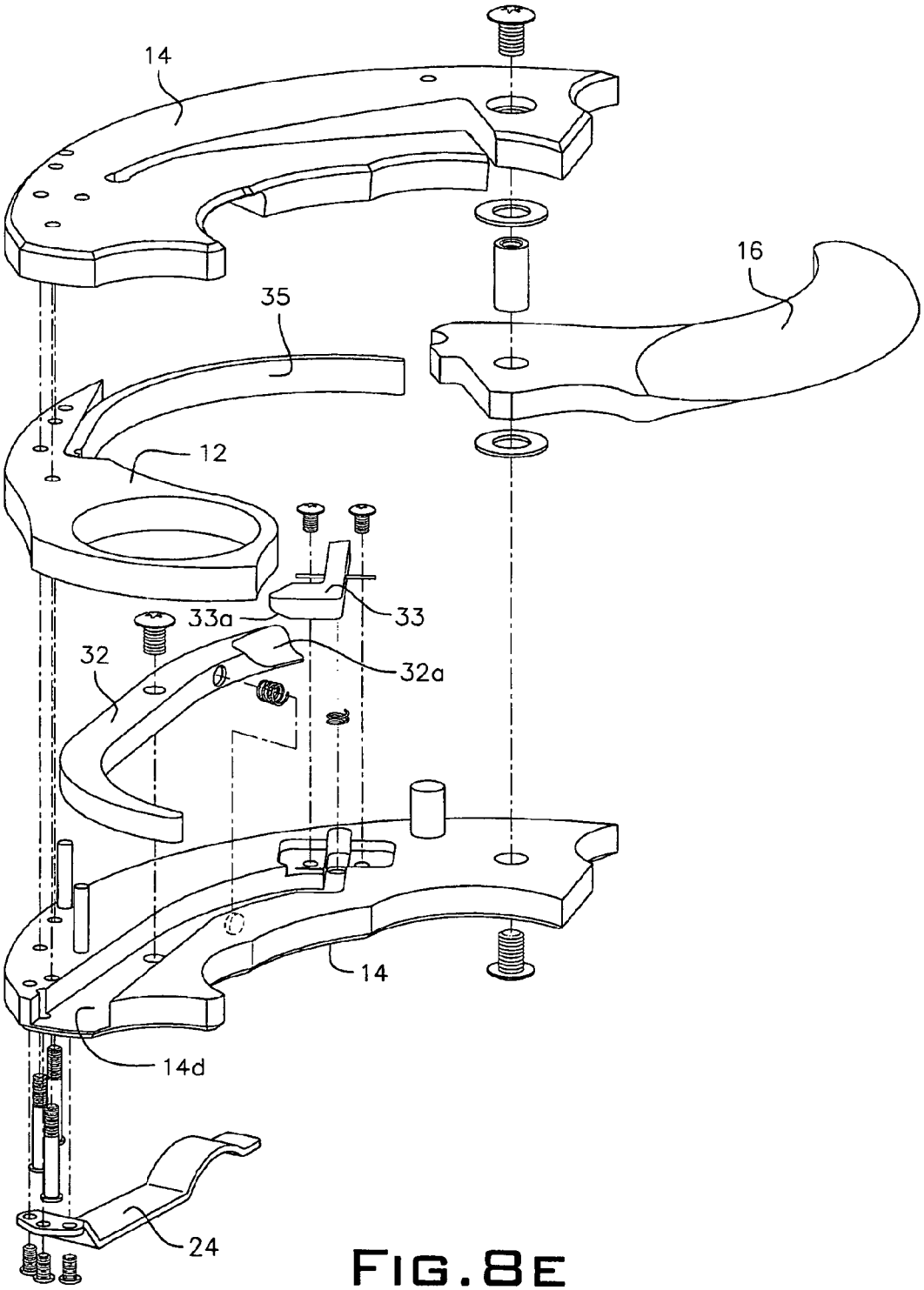
FIG. 8E is an expanded exploded view showing examples of parts of the embodiment of FIG. 8D.
Figure 8F:
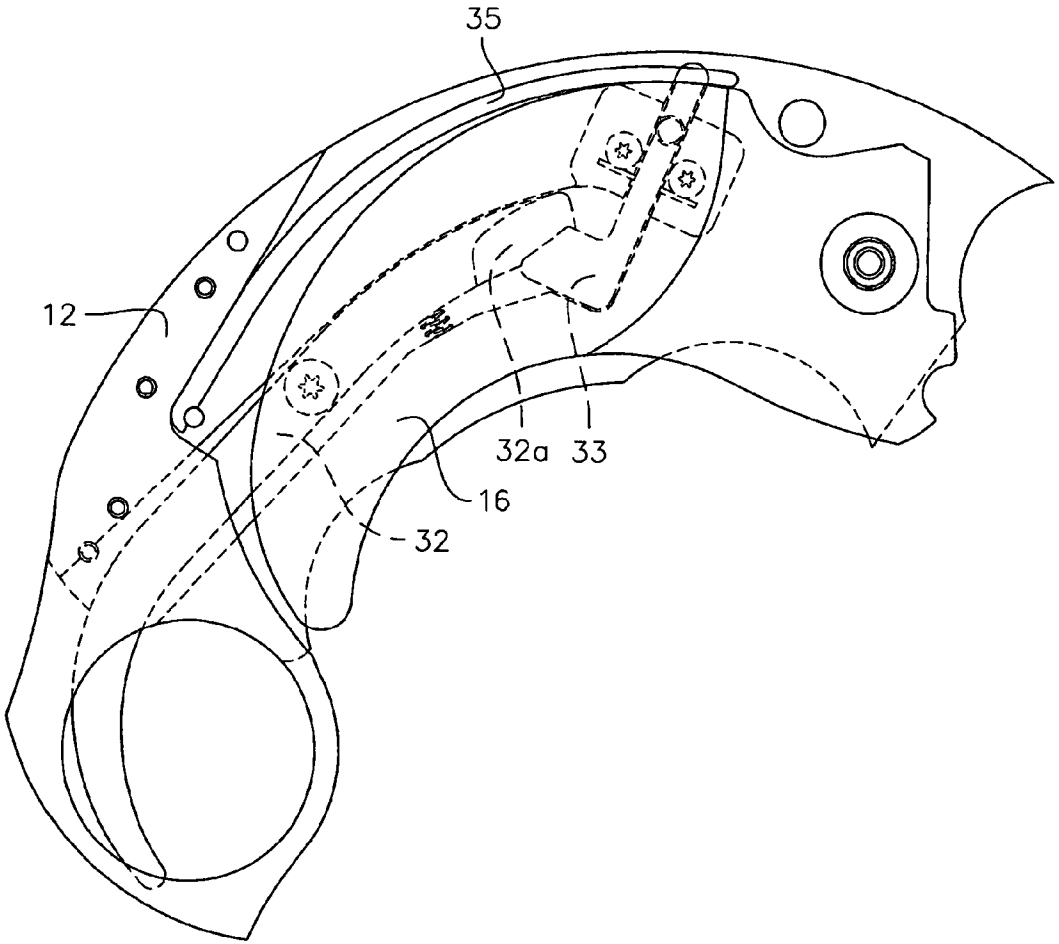
FIG. 8F is a representational view of the beginning of a motion depiction of the embodiment of FIGS. 8A-8E.
Figure 8G:
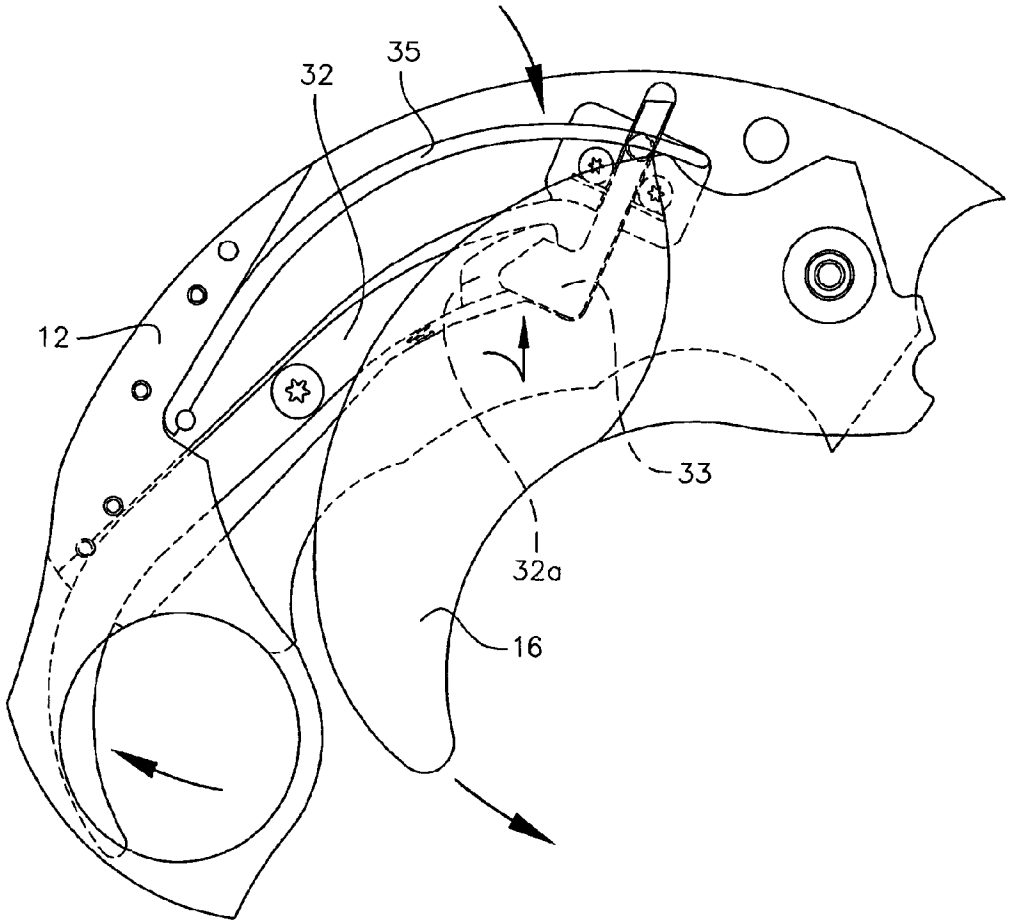
FIG. 8G is a representational view of the another stage of the motion depiction of the embodiment of FIGS. 8A-8E.
Figure 8H:
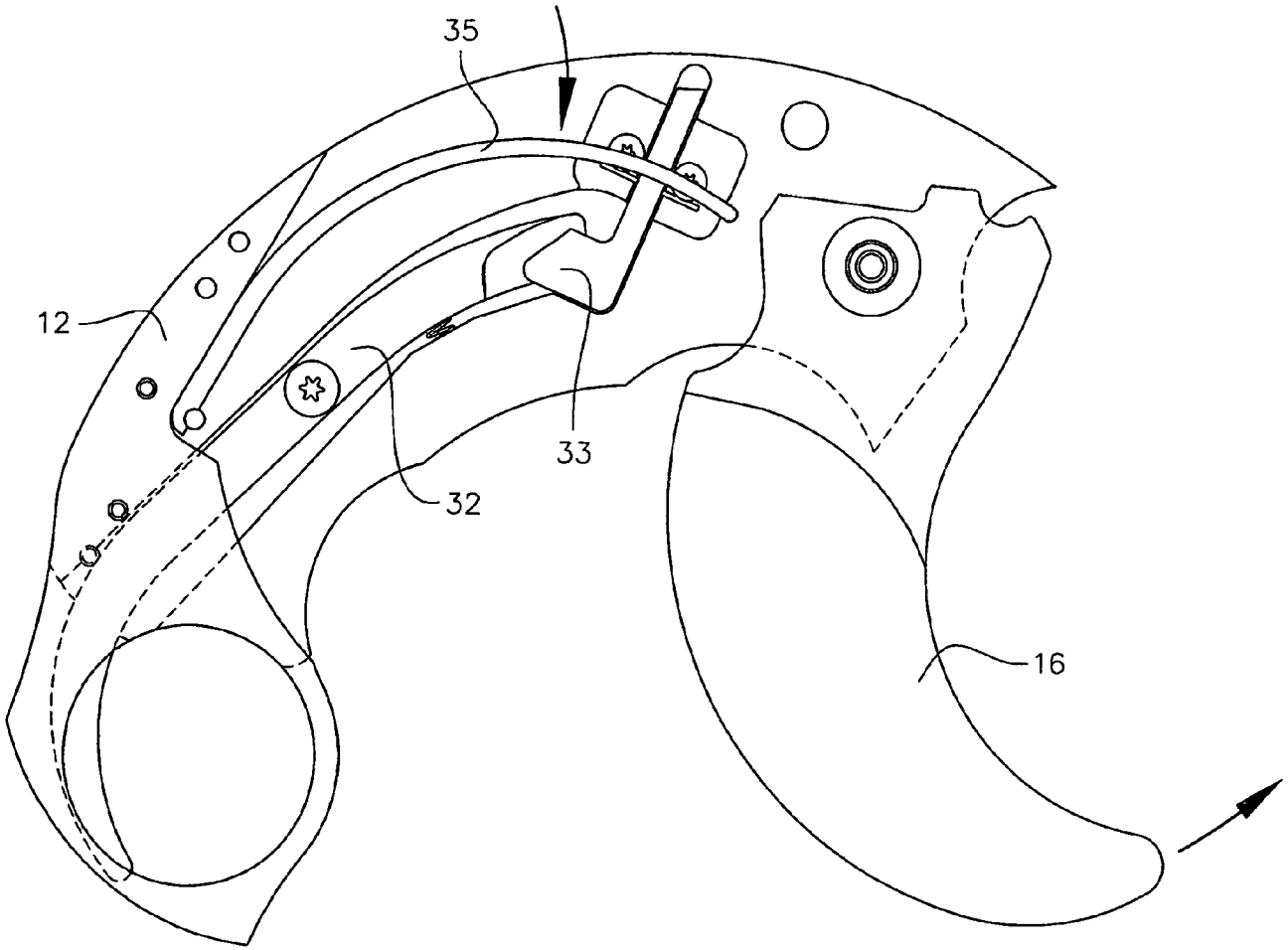
FIG. 8H is a representational view of the another intermediate stage of the motion depiction of the embodiment of FIGS. 8A-8E.
Figure 81:
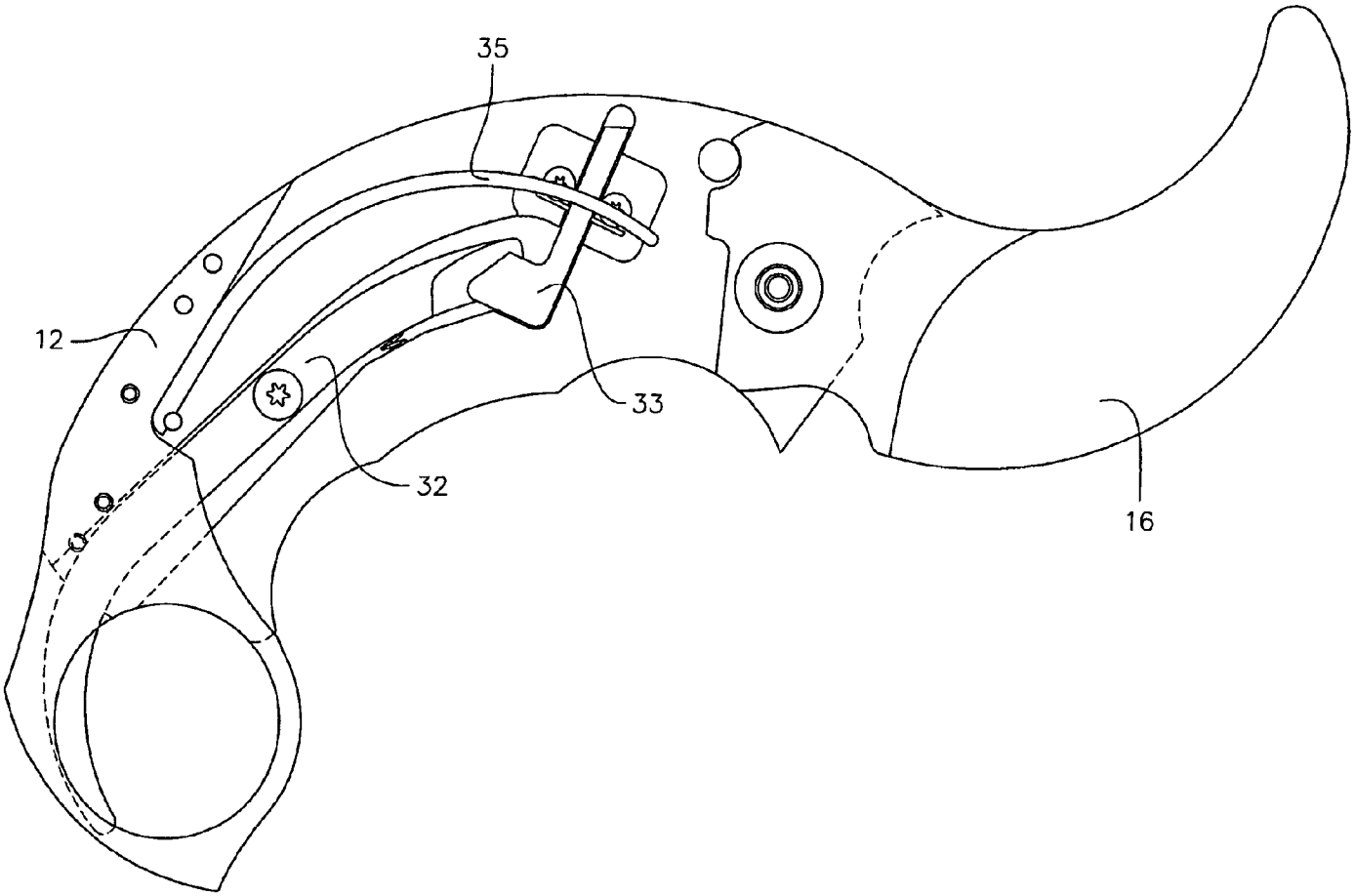

In still another embodiment, the tool 10,10A further comprises means 18 for disorienting a person or for illuminating an area. One example of providing this capability is the inclusion of a LED light 18a on one side or both sides of the handle portion 14 near the ring portion 12. The LED light 18 is shown in one side in FIGS. 4 and 6, however, it is understood that the opposite side would have an LED light 18a that effectively is a mirror image of the light shown in FIGS. 4 and 6. An on/off switch 18b for operation of the LED light(s) 18a is preferably provided and located near the ring portion 12. As shown in the drawings, the LED light 18a is preferably a single or bilateral high output LED. It is attached on one side or on both sides of the handle 14 at or near where the ring portion 12 joins the handle portion 14 and is oriented to light in the direction toward the ring portion 12 and away from the handle portion 14. Switch 18b can be a slide switch with appropriate positions to activate desired features. For example, a position to activate a strobe light mode, another to activate a light-steady on mode and another to shut off the light. Another equivalent switch is one that may be tapped where one tap activates a strobe light mode, two taps activates a light-steady-on mode, and another tap shuts the LED light(s) off. The lighting function is powered using a DC-voltage power source in the form of one or more batteries located in the handle portion 14, where the power source 18c is in electrical communication with the switch 18b and LED light(s) 18a. This lighting feature provides for a useful tool for disorienting an opponent, temporarily blinding an opponent or for illuminating an area.

The lighting feature may be one that is permanently attached to the tool 10 or one that allows for removability as desired by having it as an insert or other type of attachment to the tool 10,10A.

A thumb support member 20 is optionally located near the ring portion 12. The thumb support member 20 is configured to sit behind the ring portion 12 on an outside curve 14a of the handle portion 14. Preferably, the thumb support member 20 is also further configured to be capable of being rotatably flipped to extend over and against the ring portion 12. The thumb support member 20 allows for more force to be applied with less effort from the user. It can also be used as a striking device to specific areas of the body for compliance purposes.

In still another very useful embodiment, the tool 10 includes a shock features such as one that can provide a 25,000 volt or a 50,000 volt charge (as desired) to an opponent being subdued. One example of providing this feature is the inclusion of electrical conductive strips 22a in and/or on the blade portion 16 where the strips 22a extend from the tip 16a of the blade portion 16, and along or generally imbedded within the blade portion 16 so as to be in DC-voltage electrical communication with capacitor means 22b for holding a charge and activation means 22c for on/off operation of the means for delivering the voltage shock. As shown in the drawings by way of example, the respective outside and inside curves of the blade portion have two separated metal conductive strips 22a. When the strips 22a come in contact with a conducting surface, that is, the skin, and the user depresses the on/off switch 22c, a predetermined amount of voltage is delivered to the opponent. The DC voltage power source further includes batteries 22e and coils 22k to build charge into the capacitor(s) 22b, as well as a charging circuit 22g. In a preferred embodiment, it is also preferable to add a safety switch 22d feature with on/off switch 22c.

Figure 2:
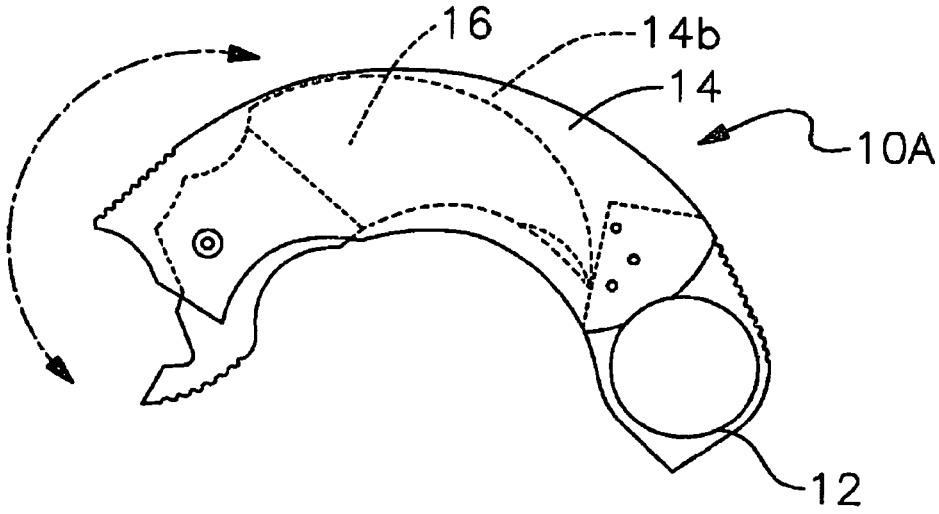
FIG. 2 is a depiction similar to FIG. 1 with the blade folded within the cavity of the blade handle.
Figure 3A:
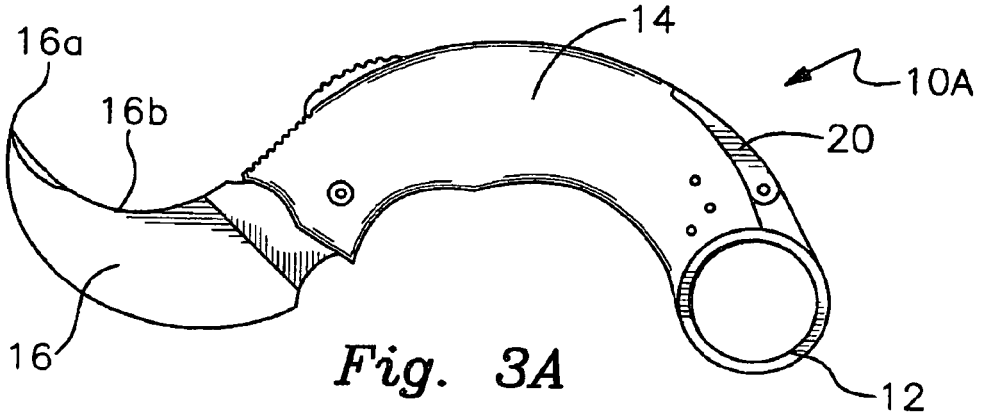
FIG. 3A is a front view of a folding version of the present invention which depicts a thumb support member in a closed position.
Figure 3B:
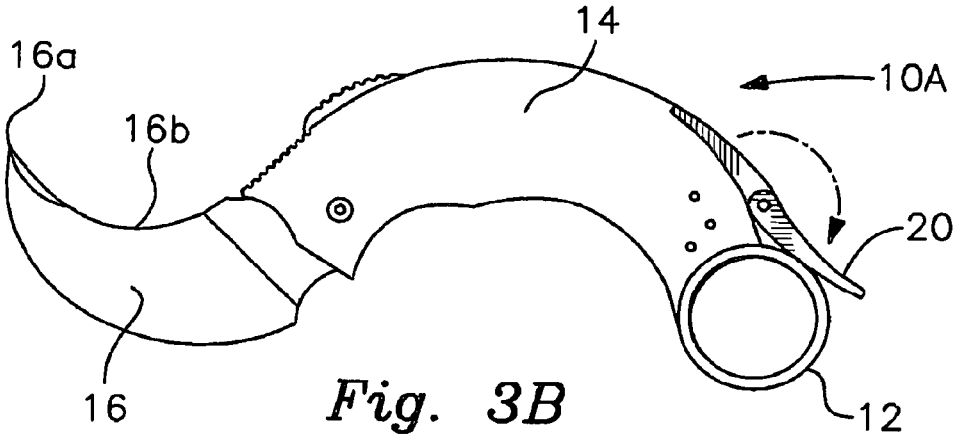
FIG. 3B is a view of the depiction of FIG. 3A with the thumb support member extended outward.
Figure 4:
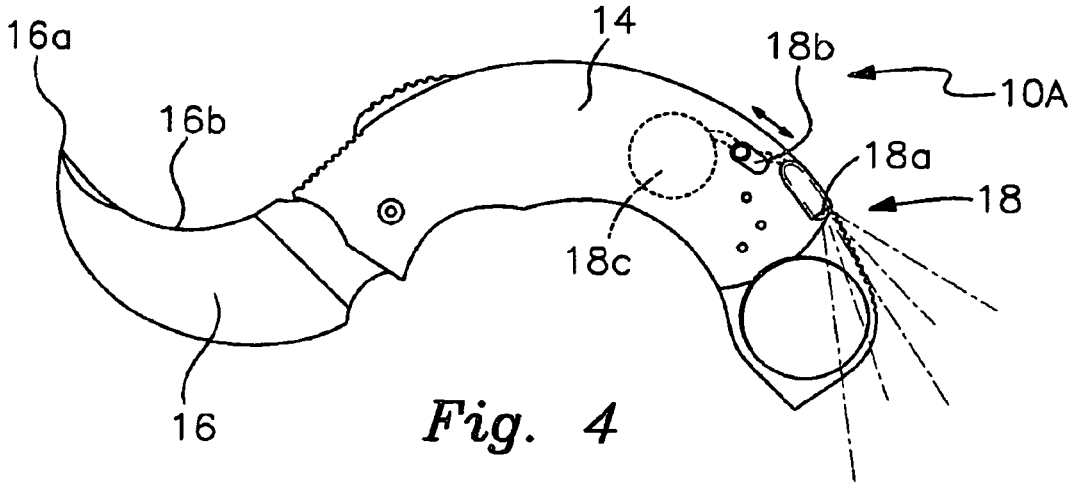
FIG. 4 is a front view of a folding version of the present invention depicting an alternative LED light/strobe light feature for the invention.
Figure 5:
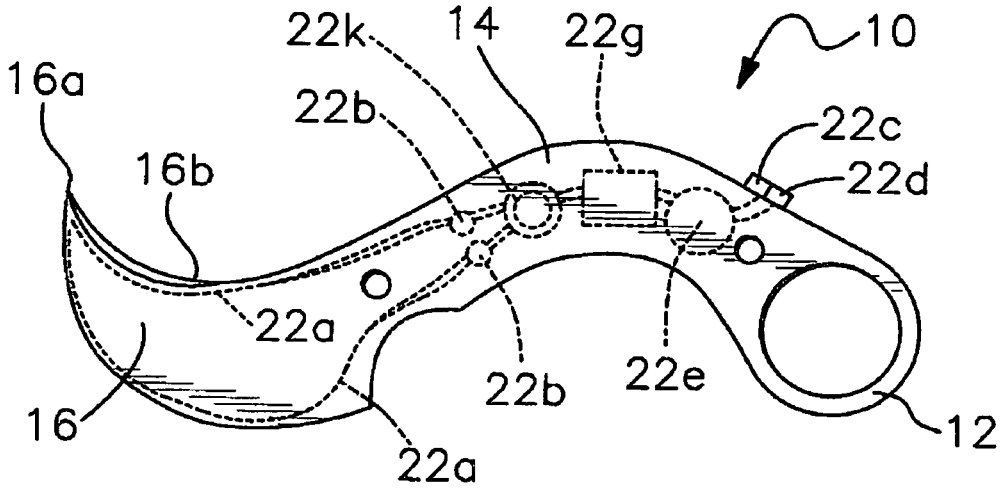
FIG. 5 is a front view depicting a solid version of the present invention with shock application features.

The present invention 10 need not only a single solid piece but may alternatively be made in a folding version 10A. This version includes a cavity 14b in the handle portion 14 where the blade portion 16 is rotatably interconnected to a back end of the handle portion 14, that is, the blade portion 16 is configured to be rotated and stored in a closed position within the cavity 14b thereby forming a foldable compliance tool 10A. FIG. 2 depicts blade 16 folded and stored within the cavity 14b of the handle 14. In this embodiment, the handle portion 14 has on one side thereof a tang portion 14c configured for selectively releasing and opening the blade portion 14 from the cavity 14b and for selectively locking the blade portion 14 in an open extended position by engaging the back end of the opened blade 14. Tang 14c makes up part of a blade locking mechanism found in knives such as structural feature 42 depicted and described in U.S. Pat. No. 6,725,545 issued Apr. 27, 2004 to Bram Frank. Sliding the tang 14c toward the inside surface of the handle 14 allows the blade 16 to be folded inside the cavity 14b. When the blade 16 is extended out from the cavity 14b, the tang 14c springs toward the center of the sides of the handle and engages/interlocks with the back of the blade 16.

The present invention can be made with a variety of materials. For example, the solid tool 10 may be made from metal or polymer based composite resinous materials or even a combination of these materials for different parts of the tool. Similarly for the folder version of the tool; however, it is preferable that the folder version be made from materials similar to that used for folding knives, that is, all metal materials, or a metal blade with polymer based composite resinous materials for parts of the handle portion 14 and/or the ring portion 12.

A pocket clip 24 is optionally provided on one side of the handle portion 14.

Neither the single piece nor the folder version of the present invention has sharp edges or points that can pierce the skin. The purpose of the tool 10,10A is for self defense/control of an attacker by applying pressure with the tip of the tool 10,10A (to specific areas of the body) or by striking specific areas of the body with the tool 10,10A. The ergonomic design allows for the tool to be used with minimal amount of strength from the user but the force can be incremented depending on the user skill level.

Although the drawings for simplicity sake may feature one of the thumb support member, the LED light/strobe light feature or the shock application feature, it should be understood that any or all of these features, as applicable, could be included in the invention embodiment.

In another embodiment as depicted in FIGS. 8A-8I, the folding version of the invention becomes an automatic blade releasable self-defense tool comprising a generally S-shaped tool 10A having a handle portion 14 for holding said S-shaped tool 10A and a blade portion 16. The blade portion 16 has a tip portion 16a at an opposite end of said S-shaped tool 10A. The handle portion 14 further comprises a cavity 14b therein wherein the blade portion 16 is rotatably interconnected to a back end of the handle portion 14 and configured to be rotated and stored in a closed position within the cavity 14b thereby forming a foldable self-defense tool. The self-defense tool further comprises means 30 for auto-releasing the blade portion 16 from the cavity 14b wherein the auto-release means 30 includes a trigger activation member 32 extending from an end opposite the blade portion 16 directed internally into the cavity 14b and having at its opposite end a chamfered portion 32a that is engageable with a sheer pin member 33, which may or may not have a mating chamfered surface 33a. The sheer pin member 33 is movable in a lateral motion by the engagement of the chamfered portion 32a with the sheer pin member 33. The lateral motion allows the sheer pin member 33 to engage and activate a spring leaf member 35 that when activated, pushes the blade portion 16 in an open extended position. The depicted screws, bushings, washers are not enumerated for sake of simplicity.

The trigger activation member 32 is generally parallel to the ring portion 12 and extends from the ring portion 12 internally into a channel 14d within the handle portion 14 adjacent the cavity 14b.

It should be understood that the preceding is merely a detailed description of one or more embodiments of this invention and that numerous changes to the disclosed embodiments can be made in accordance with the disclosure herein without departing from the spirit and scope of the invention. The preceding description, therefore, is not meant to limit the scope of the invention. Rather, the scope of the invention is to be determined only by the appended claims and their equivalents.

What is claimed is:

1. A self-defense tool comprising:

a generally S-shaped tool having at one end thereof a ring portion for finger placement;

a handle portion for holding said S-shaped tool, said handle portion being located between said ring portion and a blade portion; and said blade portion having a tip portion at an opposite end of said S-shaped tool, wherein said handle portion further comprises a cavity therein wherein said blade portion is rotatably interconnected to a back end of said handle portion and configured to be rotated and stored in a closed position within said cavity thereby forming a foldable self-defense tool; and said self-defense tool further comprising means for auto-releasing said blade portion from said cavity wherein said auto-release means includes a trigger activation member that extends generally parallel to said ring portion so as to be activated with a pressing of a finger inserted within said ring portion, said trigger activation member extending from said ring portion internally into said cavity and having at its opposite end a chamfered portion that is engageable with a sheer pin member wherein when said trigger activation member is pressed, said trigger activation member is caused to slide under said sheer pin member, said sheer pin member being movable so as to be pushed downward by the engagement of said chamfered portion with said sheer pin member and wherein a spring leaf member that has a normal tensioned position when said self-defense tool is in a folded closed position, is released to apply a forward urging at a bottom inside curve of said blade portion, thereby moving the blade portion forward and out of said cavity where said blade portion is in a fully opened locked position by the engagement of said blade portion with a tang portion of said handle portion.

2. The self-defense tool according to claim 1, wherein said blade portion further comprises an inside curve portion.

3. The self-defense tool according to claim 1, further comprising means for disorienting a person or for illuminating an area.

4. The self-defense tool according to claim 3, wherein said means for disorienting a person or for illuminating an area comprises:

a LED light on one side or both sides of said handle portion near said ring portion;

activation means for on/off operation of said LED light, said activation means being located near said ring portion; and DC-voltage power source located in said handle portion, said power source being in electrical communication with said activating means and said LED light.

5. The self-defense tool according to claim 4, wherein said activation means further comprises means for selectively operating said LED light in a steady-on mode or in a strobe light mode.

6. The self-defense tool according to claim 1, further comprising:

a thumb support member located near said ring portion, said thumb support member being configured to extend over and against said ring portion.

7. The self-defense tool according to claim 1, further comprising:

a thumb support member located near said ring portion, said thumb support member being configured to sit behind said ring portion on an outside curve of said handle portion and being further configured to be capable of being rotatably flipped to extend over and against said ring portion.

8. The self-defense tool according to claim 1, further comprising:

means for delivering a predetermined voltage shock to said person's body.

9. The self-defense tool according to claim 8, wherein said means for delivering a voltage shock to said person's body comprises:

electrical conductive strips in said blade portion extending from said tip of said blade portion and along said blade portion so as to be in DC-voltage electrical communication with capacitor means for holding a charge and activation means for on/off operation of said means for delivering said voltage shock.

10. The self-defense tool according to claim 9, wherein said predetermined voltage shock is from a DC-voltage source that is adapted to deliver about 25,000 volts to about 50,000 volts.

11. The self-defense tool according to claim 1, wherein said handle portion further comprises a cavity therein wherein said blade portion is rotatably interconnected to a back end of said handle portion and configured to be rotated and stored in a closed position within said cavity thereby forming a foldable self-defense tool; and said handle portion having on one side thereof a tang portion configured for selectively releasing and opening said blade portion from said cavity and for selectively locking said blade portion in an open extended position.

12. The self-defense tool according to claim 1, wherein said generally S-shaped tool is made from a polymer resin material or a metal material.

13. The self-defense tool according to claim 11, wherein said handle portion of said foldable self-defense tool is made from a metal or polymer resin material, said blade portion of said foldable self-defense tool is made from a metal material and said ring portion of said foldable self-defense tool is made from a polymer resin material or a metal material.

14. The self-defense tool according to claim 1, further comprising a pocket clip on one side of said handle portion.

15. An automatic blade releasable self-defense tool comprising:

a generally S-shaped tool having a handle portion for holding said S-shaped tool and a blade portion;

said blade portion having a tip portion at an opposite end of said S-shaped tool;

said handle portion further comprising a cavity therein wherein said blade portion is rotatably interconnected to a back end of said handle portion and configured to be rotated and stored in a closed position within said cavity thereby forming a foldable self-defense tool; and said self-defense tool further comprising means for auto-releasing said blade portion from said cavity wherein said auto-release means includes a trigger activation member extending from an end opposite said blade portion directed internally into said cavity and having at its opposite end a chamfered portion that is engageable with a sheer pin member, wherein said sheer pin member is movable in a lateral motion by the engagement of said chamfered portion with said sheer pin member and wherein said lateral motion allows said sheer pin member to engage and activate a spring leaf member that when activated, pushes said blade portion in an open extended position.

16. The automatic blade releasable self-defense tool according to claim 15, wherein said generally S-shaped tool has at one end thereof a ring portion for finger placement, said handle portion being located between said ring portion and said blade portion, and said trigger activation member being generally parallel to said ring portion and extending from said ring portion internally into a channel within one side of said handle portion adjacent said cavity.

*17. A self-defense tool comprising:*

*a generally S-shaped self-defense tool;*

*a blade portion;*

*a handle portion for holding said tool;*

*a thumb support member, said thumb support member being attached to the self-defense tool and being further configured to be selectively placed in an opened or closed position independently of the blade portion position, the thumb support member laying along the handle portion in the closed position and extending rearwardly of the handle portion in the open position; and*

*the blade portion having a tip portion at an opposite end of said tool from an attachment point of said thumb support member.*

*18. The self-defense tool according to claim 17, wherein said handle portion further comprises:*

*a cavity therein wherein said blade portion is rotatably interconnected to a back end of said handle portion and configured to be rotated and stored in a closed position within said cavity.*

*19. The self-defense tool according to claim 17, wherein said tool is configured to be a foldable tool wherein said blade portion is rotatably interconnected to a back end of the handle portion.*

*20. The self-defense tool according to claim 17, further comprising a ring portion formed as an opening at one end of the self-defense tool, said ring portion configured for inserting a user's finger.*

* * * * *